United States Patent [19]

Kawamura et al.

[11] Patent Number: 5,621,725
[45] Date of Patent: Apr. 15, 1997

[54] COMMUNICATION SYSTEM CAPABLE OF PREVENTING DROPOUT OF DATA BLOCK

[75] Inventors: Harumi Kawamura, Tokyo; Hisato Shima, Chiba; Keiko Tamamizu, Kanagawa, all of Japan

[73] Assignee: Sony Corporation, Tokyo, Japan

[21] Appl. No.: 449,784

[22] Filed: May 24, 1995

[30] Foreign Application Priority Data

May 25, 1994 [JP] Japan .................................. 6-134940

[51] Int. Cl.$^6$ .................................................. H04L 29/12
[52] U.S. Cl. .................................................. 370/43; 370/99
[58] Field of Search ................................ 370/43, 49, 61, 370/94.1, 94.2, 99; 375/369, 370

[56] References Cited

U.S. PATENT DOCUMENTS

| | | | |
|---|---|---|---|
| 4,313,193 | 1/1982 | Nakano et al. | 370/43 |
| 4,519,068 | 5/1985 | Krebs et al. | 370/94.2 |
| 5,299,191 | 3/1994 | Boyer et al. | 370/61 |
| 5,384,770 | 1/1995 | Mays et al. | 370/43 |
| 5,497,371 | 3/1996 | Ellis et al. | 370/61 |

*Primary Examiner*—Benedict V. Safourek
*Attorney, Agent, or Firm*—Jay H. Maioli

[57] ABSTRACT

In a data communication system, even when cycle start data or a communication start signal of a communication cycle is not received, data blocks corresponding to that communication cycle can still be transmitted by effectively utilizing the frequency band. In the data communication system, space for at least one additional data block is allocated to every communication cycle such that the number of data blocks transmittable in a communication cycle is greater than the total number of data blocks received in that cycle, and the data blocks are transmitted in first-in-first-out order as a packet following the communication start signal. When a communication start signal is not received for a communication cycle, the data blocks of that communication cycle are transmitted in the next communication cycle in which a communication start signal is received and the allocated space for additional data block(s) in subsequent communication cycles is utilized until the data blocks corresponding to a given communication cycle are transmitted in that given communication cycle.

10 Claims, 6 Drawing Sheets

| 0 | 6 | 11 |
|---|---|----|

| 0 | 7 |
|---|---|

FIG. 10 csp : CYCLE START PACKET

FIG. 11

① ~ ③ : PORT NUMBER

COMMUNICATION SYSTEM CAPABLE OF PREVENTING DROPOUT OF DATA BLOCK

BACKGROUND OF THE INVENTION

1. Field of the Invention

The present invention relates to a communication system for transmitting real time data, e.g., video data and audio data, with employment of the communication control bus such as the serial bus standardized by IEEE-P1394 (referred to as a "P1394 serial bus" hereinafter).

2. Description of the Related Art

A communication system is conceivable such that a plurality of electronic appliances are connected to each other by means of the communication control bus such as the P1394 serial bus, and both digital information signals and control signals are communicated among these electronic appliances.

Figure 3:
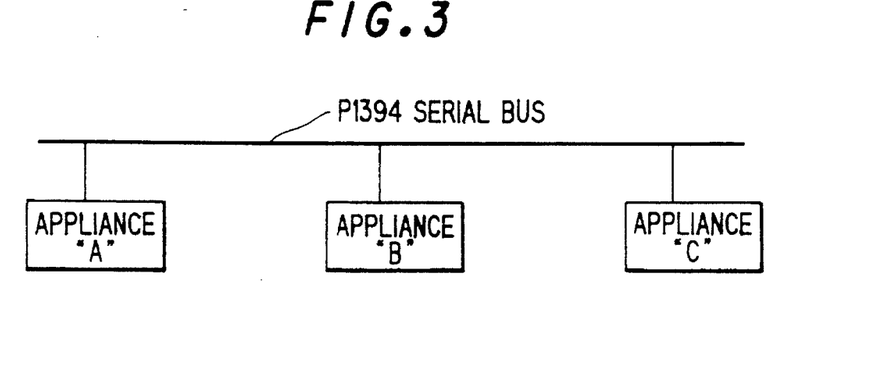
FIG. 3 schematically illustrates a communication system employing the P1394 serial bus.

In FIG. 3, there is shown an example of such a system. This system comprises electronic appliances A, B, C connected to each other by means of the P1394 serial bus. These electronic appliances are, for instance, a digital VTR, a tuner, a monitor and the like. The respective electronic appliances include a circuit with an essential function of, for example, a recording/reproducing unit for a digital VTR and a display unit for a monitor in addition to a circuit for transmitting/receiving a signal by means of the P1394 serial bus.

Figure 4:
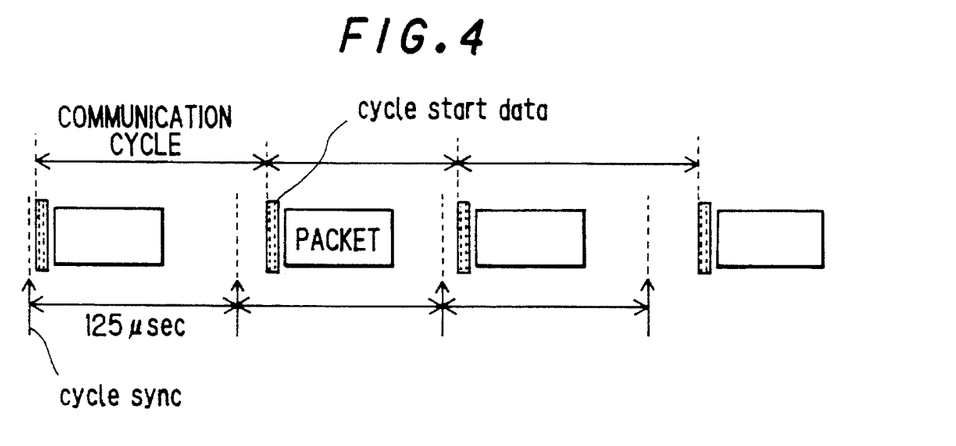
FIG. 4 schematically indicates a structural example of data in the communication system employing the P1394 serial bus.

A data transmission is carried out among the electronic appliances A to C which commonly share the P1394 serial bus every predetermined communication cycle, as illustrated in FIG. 4. With respect to the management of the communication cycle, a predetermined electronic appliance for managing the communication system, for instance, the electronic appliance A, transfers the cycle start data indicative of the starting time of the communication cycle by means of the P1394 bus to other electronic appliances, so that the data transmission in this communication cycle is commenced.

The time information on the P1394 serial bus is managed by a timer register used by each of these electronic appliances. The timer registers employed in the respective electronic appliances use internal clocks to produce the time information. This time information is reset on the basis of the timing of the cycle sync every 125 microseconds (see FIG. 4). Then, this time information is corrected based on the time information given to the cycle start data.

As a data format transmitted within one communication cycle, there are two sorts of data format, i.e., a synchronous type data packet such as video data and audio data, and an asynchronous type data packet such as a connection control command. Then, the synchronous type data packet is transmitted prior to the asynchronous type data packet. FIG. 4 represents only the synchronous type data packet.

In the communication system with such an arrangement, when the communication cycle is repeated every 125 microseconds under ideal conditions, the time period at which the timer registers employed in the respective electronic appliances are reset is coincident with that of the cycle start data. However, when the transmission time of the asynchronous type data packet is prolonged, since the timing at which the next communication cycle is commenced is delayed, the timing of the cycle start data is delayed, as compared with that of the cycle sync.

Considering a case like the above-described communication system, both of the video data and the audio data (referred to as "AV data" hereinafter), which are output by the digital VTR, are transmitted to another video VTR.

Figure 5:
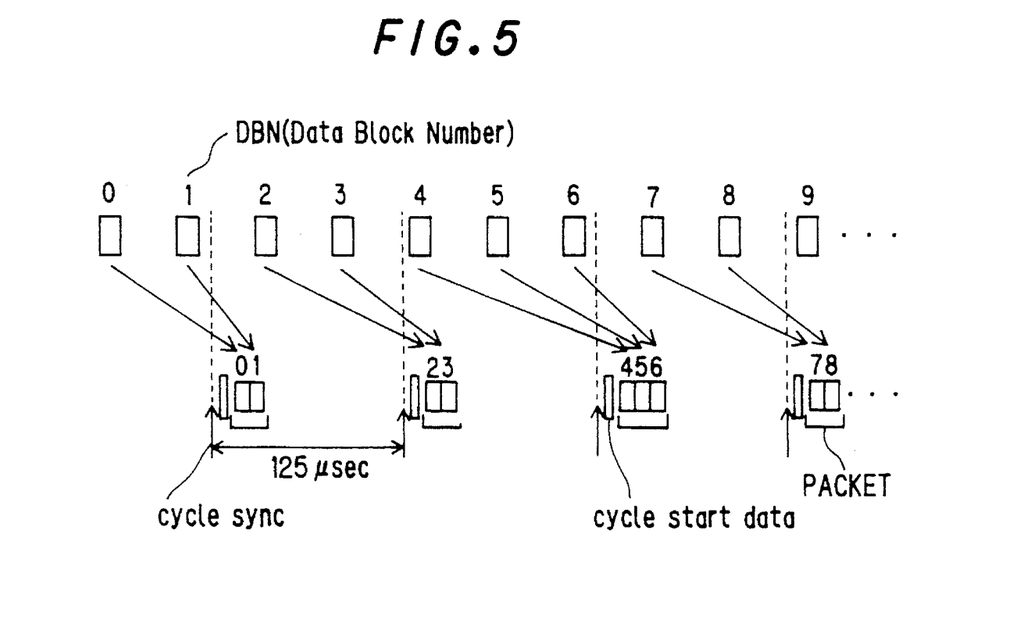
FIG. 5 schematically shows a model for packeting AV data to be transmitted in the communication system employing the P1394 serial bus.

FIG. 5 represents a model of the AV data packeted for transmission. The AV data reproduced by the digital VTR are arranged as an array of data blocks having constant sizes, as shown in FIG. 5, which arrive at the transmitter circuit. This data block process is performed by using a FIFO method, or first-in first-out method, employed between the recording/reproducing unit of the digital VTR and the transmitter circuit. The data blocks received by this transmitter circuit are numbered according to the serial data block number, and are packeted in the unit of a data block, and then the packeted data blocks are sent out to the data bus. At this time, the data blocks which have been received during a time period from one preceding cycle sync to the present cycle sync are packeted in accordance with the data block numbers from the lower numbers to the higher numbers, and then the packeted data blocks are transmitted after the cycle start data.

In FIG. 5, since the data blocks are received by the transmitter circuit during an interval of approximately 50 microseconds, when normal communication is carried out, the number of data blocks transmitted by one packet is equal to either 2 or 3.

Furthermore, referring now to FIG. 8, another concrete example of such a communication system will be explained. This communication system is equipped with a TV, a VTR 1, a VTR 2, and a camcorder (referred to as a "CAM" hereinafter) as the AV appliance. Then, the P1394 serial buses capable of transmitting the digital AV signal and the control signal in the mixture state are employed to connect the CAM with the TV, the TV with the VTR 1, and the VTR 1 with the VTR 2. Each of these appliances has the function of relaying the control signal and the digital AV signal to the P1394 serial bus.

Figure 8:
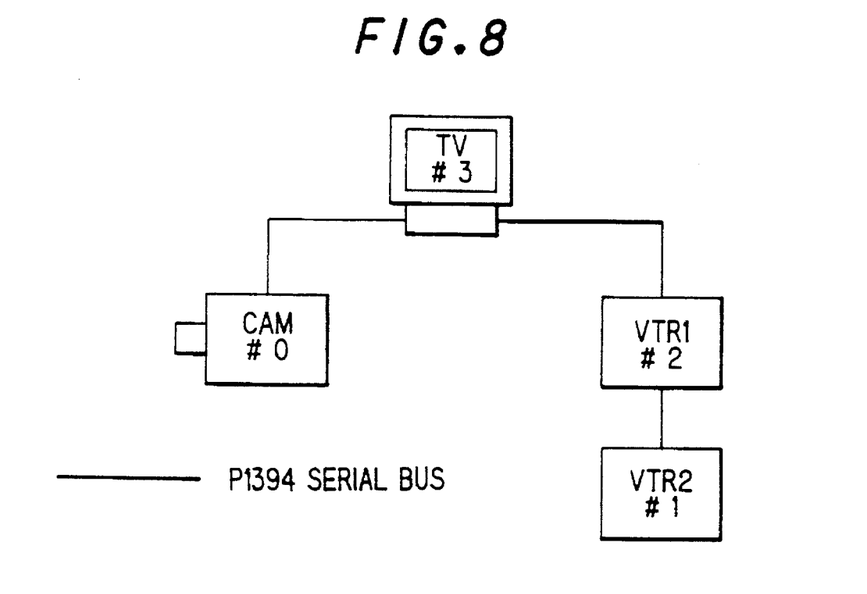
FIG. 8 schematically indicates an example of an AV communication system employing the P1394 serial bus, according to an embodiment of the present invention.
Figure 9:
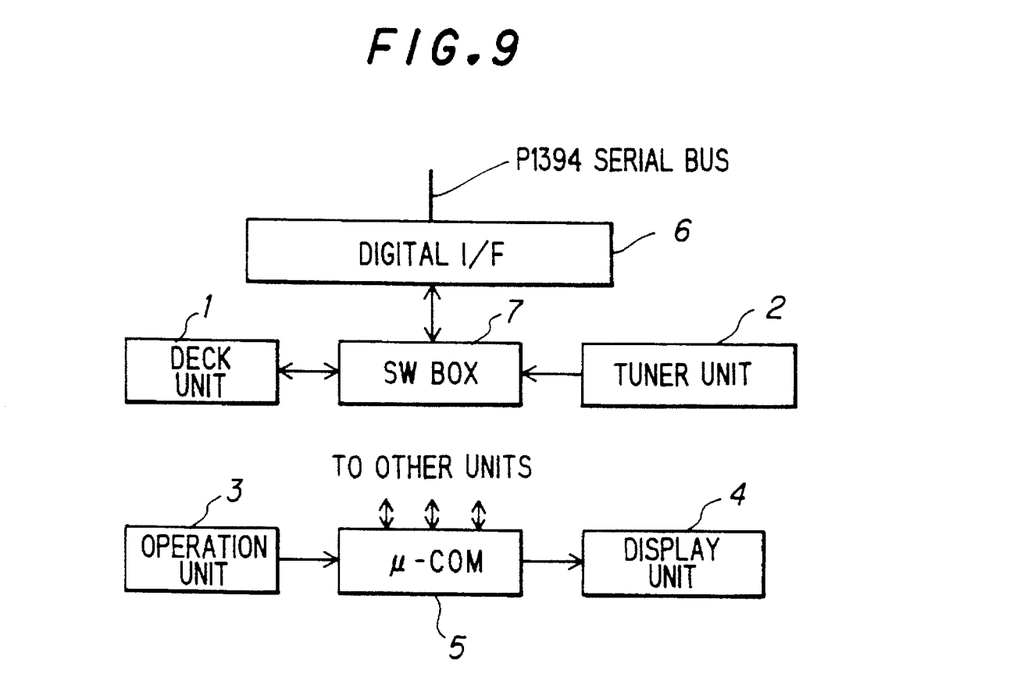
FIG. 9 is a schematic diagram for showing an arrangement of an AV appliance employed in the AV communication system of FIG. 8.

FIG. 9 is a block diagram for indicating a basic arrangement of a VTR corresponding to one example of the AV electronic appliance employed in the communication system of FIG. 8. This VTR includes, as the basic components of the VTR, a deck unit 1, a tuner unit 2, an operation unit 3 functioning as a user interface, a display unit 4, and a microcomputer 5 for controlling the overall operations of the VTR, for producing a packet (described hereinafter), and for holding an address. This VTR further comprises a digital interface (referred to as a "digital I/F" hereinafter) 6 for the P1394 serial bus, and a switch box unit 7 for switching signals among the deck unit 1, the tuner unit 2, and the digital I/F 6.

It should be noted that when a TV is employed as the AV appliance, a monitor unit and an amplifier unit are used instead of the deck unit 1, and no display unit 4 is employed. In case of a CAM, a camera unit is provided instead of the tuner unit 2.

Figure 10:
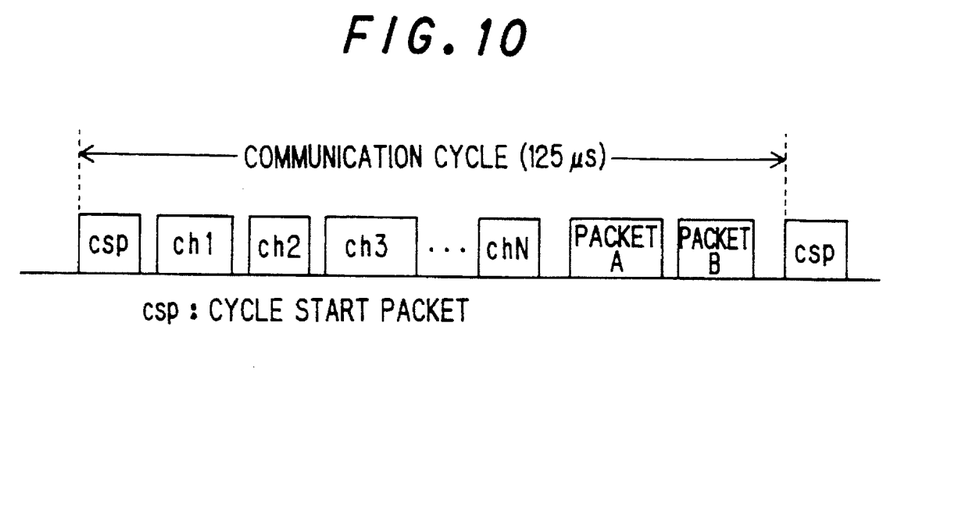
FIG. 10 schematically indicates an example of a communication cycle employed in the AV communication system of FIG. 8.

As illustrated in FIG. 10, a data transmission is performed in a preselected communication cycle (for example, 125 microseconds) in the communication system of FIG. 8. Then, both of the synchronous communication and the asynchronous communication can be carried out. In the synchronous communication, the data signal such as the digital AV signal is continuously transmitted at a constant data rate, whereas in the asynchronous communication, the control signal such as the connection control command is irregularly transmitted, if required.

The cycle start packet CSP is present at the beginning of the communication cycle, and subsequently, a time period is set during which the packet for the synchronous communication is transmitted. The channel numbers 1, 2, 3, ..., N are attached to the respective packets for performing the synchronous communication, so that a plurality of synchronous communications can be achieved.

Assuming now that the channel 1 is allocated to the communication performed from the CAM to the VTR 1, the CAM transmits the synchronous communication packet attached with the channel number 1 just after the cycle start packet CSP, the data bus is monitored by the VTR 1, and then the synchronous communication packet attached with the channel number 1 is acquired to perform the communication. Furthermore, when the channel 2 is allocated to the communication from the VTR 2 to the TV, both of the communication from the CAM to the VTR 1 and the communication from the VTR 2 to the TV can be carried out in a parallel manner.

Then, after the transmission of the synchronous communication packets for all of the channels have been completed, the time period up to the next cycle start packet CSP is used as the asynchronous communication. In FIG. 10, packets A and B correspond to the asynchronous communication packets.

In the communication system with employment of the P1394 serial bus, when the respective AV electronic appliances are connected to each other by means of the serial buses, the node ID (physical address) is automatically allocated in accordance with these connection conditions. In the case of FIG. 8, symbols #0 to #3 correspond to the node ID. Next, the allocating sequence of the node ID will be simply explained with reference to FIG. 11.

Figure 11:
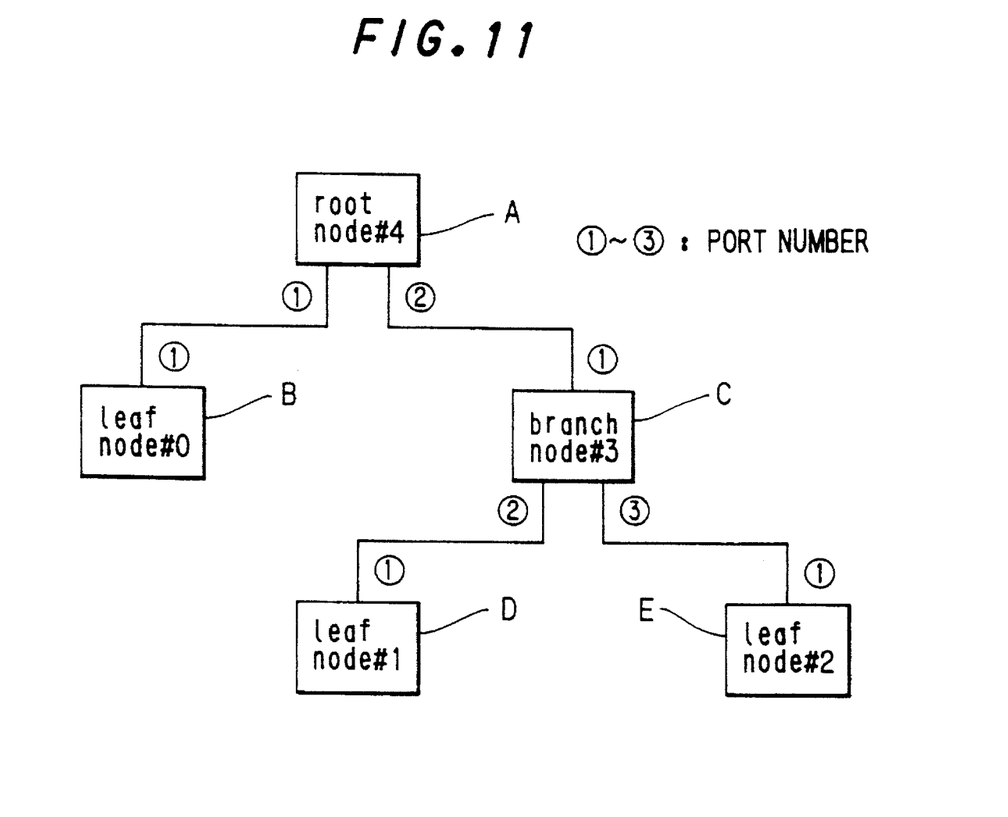
FIG. 11 is an explanatory diagram for explaining a sequence to allocate node IDs employed in the communication system employing the P1394 serial bus.

In FIG. 11, such a hierarchical structure is made that a leaf node B and a branch node C are connected to the lower grade of the route node A, and further, a leaf node D and a leaf node E are connected to the lower grade of the branch node C. In other words, the node A corresponds to the parent node for the nodes B and C, and the node C corresponds to the parent node for the nodes D and E. First, a description will be made of the sequence for determining this hierarchical structure.

When a twist-pair cable of the P1394 serial bus is used to connect the nodes A and B, the nodes A and C, and the nodes C and E, the node in which only one input/output port is connected to another node transfers such a message to the other node that the counter node with only one input/output part corresponds to the parent node. The term "counter node" may be defined as the node connected to the present node.

In the case of FIG. 11, the node B transfers such a message that node B corresponds to the parent node for port 1 of the node A, the node D transfers such a message that node D corresponds to the parent node for the port 2 of the node C, and the node E transfers such a message that node E corresponds to the parent node of port 3 of the node C.

As a result, when the node A recognizes that the child node is connected to the port 1, the port 1 notifies the node B that it corresponds to the child node. Also, the node C notifies from the port 2 thereof to the node D that it corresponds to the child node, and notifies from the port 3 thereof to the node E that it corresponds to the child node.

Then, the nodes having a plurality of input/output ports are connected to other nodes transfer messages that the counter nodes correspond to the parent node and with respect to nodes other than the nodes to which such a message has been transferred, that they are the parent nodes.

In the case of FIG. 11, the node C sends to the port 2 of node A a message that the node A corresponds to the parent node, and the node A sends to the port 1 of the node C such a message that the node C corresponds to the parent node. At this time, since the counter nodes will send between the node A and the node C such messages that they correspond to the parent nodes, the node which first receives a message that it corresponds to the parent node becomes the parent node.

If the counter nodes transfer at the same time such messages that they are the parent nodes, then after the nodes wait for a period of time set at random by the respective nodes, the counter nodes then send messages that they are the parent nodes. FIG. 11 indicates such a case that the node A becomes the parent node.

It should be noted that in the above description, the nodes B, D, E whose single input/output port is connected to an other node transfer such a message that the counter node corresponds to the parent node with respect to the part connected to its own node. Alternatively, for instance, when the timing for the node B to transfer the message that the node A corresponds to the parent node is delayed, and the node B has transferred in advance the message that the node A corresponds to the parent, the node B becomes the route node.

Subsequently, a description will now be made of the sequence to apply the physical addresses to the respective nodes. Basically, a physical address of a node is applied in such a manner that a parent node assign a physical address to a child node. When there are a plurality of child nodes, for example, the parent node will apply the physical addresses to such child nodes which are connected to the lower port numbers.

In FIG. 11, when the node B is connected to the port 1 of the node A and the node C is connected to the port 2, the node A applies the physical address to the node B. The node B transmits to the bus the data for indicating that the node ID#0 has been assigned to its own node B.

Next, the node A determines the address with respect to the node C. The node C assigns the address to the node D connected to the port 2 of node C. The node D assigns the node ID#1 to its own node.

Subsequently, the node C applies the physical address to the node E connected to the port 3 of node C. The node E assigns the node ID#2 to its own node E. When the node C has completed the address assignments to the child nodes D and E, the node C assigns the node ID#3 to its own node C.

It should be noted that a detailed description about the P1394 serial bus involving the sequence to allocate this node ID is disclosed as "IEEE P1394 Serial Bus Specification" (issued on Oct. 14, 1993).

There are four prior patent applications:
1). EPC Laid-open No. 0614297,
2). Japanese Patent Application No. 5126682,
3). Japanese Patent Application No. 5200055,
4). Japanese Patent Application No. 6051246,
and the corresponding U.S. patent applications are still pending.

Figure 6A:
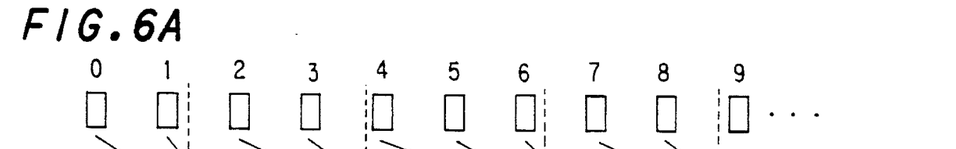
FIGS. 6A and 6E schematically represent such a condition that the data block is dropped out when the cycle start data is dropped out in the communication system of FIG. 5.
Figure 6B:
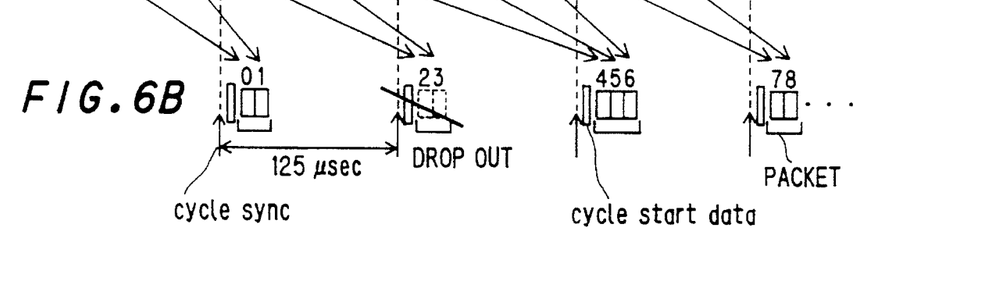

When the AV data is transmitted in such a way, as shown in FIG. 6, if the cycle start data is dropped out due to noise appearing on the bus and the bus reset operation, then the data blocks 2 and 3 would be dropped out which should be originally transmitted in the communication cycle commenced from this cycle start data. This is because the protocol for the P1394 serial bus determines that after the cycle start data has been detected, the data block is transmitted.

Figure 7A:
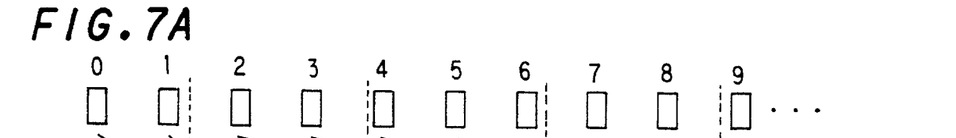
FIGS. 7A and 7B schematically represent such a condition that the data block is transmitted when the cycle start data is dropped out in the communication system of FIG. 5.
Figure 7B:
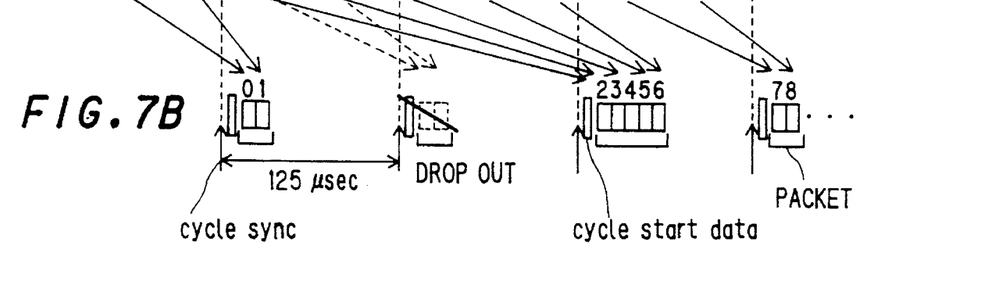

Accordingly, as illustrated in FIG. 7, in order that the data blocks are not dropped out even when the cycle start data is dropped out, the data blocks 2 and 3 which should be originally transmitted in the communication cycle starting with the dropped cycle start data may be transmitted in the communication cycle commenced from the next normal cycle start data. Since the total number of data blocks transmitted as a single data packet is increased to 5, however, the operation frequency band (bus occupation time) would also be increased. If more than two cycle start data would be consecutively dropped out, then a total number of data blocks transmitted as a single data packet will be further increased, that is the operation frequency band will be further increased. As a result, there is such a problem that the frequency band could not be effectively utilized.

The present invention has been made to solve such a problem, and therefore has an object to provide a communication system capable of effectively using a frequency band. Also, the present invention has another object to provide a communication system capable of preventing a dropout of a data block, and further, capable of effectively using a frequency band.

SUMMARY OF THE INVENTION

To solve the above-described problems, according to the present invention, in a communication system for transmitting more than one data block received for every preselected time period as a packet subsequent to a communication start signal at a time period following the time period when said more than more data block has been received, a maximum number of data blocks capable of being transmitted within a predetermined time period is determined.

The communication system of the present invention is arranged so that:

when a communication start signal is dropped out, those data blocks numbering lower than the maximum data block number are transmitted by way of a packet subsequent to a normal communication start signal, along with data blocks which have been received within a time duration defined from a starting time instant of a preselected time period during which the normal communication start signal is obtained after said communication start signal was dropped out up to a predetermined time.

Furthermore, the predetermined time is equal to two times longer than the preselected time period. Then, the communication system of the present invention is arranged such that:

when the number of data blocks which have been received within a time duration defined from a starting time instant of a period where a normal communication signal is obtained after the communications start signal is dropped out up to a predetermined time, exceeds the maximum value of the data blocks transmittable within one preselected time period, the data block having the maximum data block number is transmitted from the previously arrived data blocks.

In accordance with the present invention, the data blocks whose number is lower than the maximum data block number are transmitted as the data packet within a single preselected time period. As a consequence, since the operation frequency band does not exceed the maximum data block number, other data are transmitted by means of the remaining frequency band, so that the operation frequency band can be effectively used.

Also, according to the present invention, when a communication start signal is dropped out, such data blocks lower than the maximum data block number are transmitted by way of a packet subsequent to a normal communication start signal, along with data blocks which have been received within a time duration defined from a starting time instant of a preselected time period during which the normal communication start signal is obtained after the communication start signal was dropped out up to a predetermined time. Accordingly, even when the communication start signal is dropped out, it is possible to prevent the data block from being dropped out, and also the frequency band can be effectively utilized.

Then, according to the present invention, when the number of data blocks which have been received within a time duration defined from a starting time instant of a period where a normal communication signal is obtained after the communication start signal is dropped out up to a predetermined time, exceeds the maximum value of the data blocks transmittable within one preselected time period, the data block having the maximum data block number is transmitted from the previously arrived data blocks.

As previously described in detail, according to the present invention, since the maximum number of data blocks capable of being transmitted as a data packet within one preselected time period is known, the operation frequency band can be effectively utilized.

Also, according to the present invention, since when the communication start signal is dropped out, such data blocks lower than the maximum data block number are transmitted by way of the packet subsequent to the normal communication start signal, along with data blocks which have been received within the time duration defined from the starting time instant of a preselected time period during which the normal communication start signal is obtained after the communication start signal was dropped out up to a predetermined time, it is possible to prevent the data blocks from being dropped out, and to effectively use the operation frequency band.

BRIEF DESCRIPTION OF THE DRAWINGS

For a better understanding of the present invention, reference is made of the detailed descriptions to be read in conjunction with the accompanying drawings, in which.

DETAILED DESCRIPTION OF THE PREFERRED EMBODIMENTS

Referring now to drawings, a communication system according to an embodiment of the present invention will be described in detail.

Figure 1A:
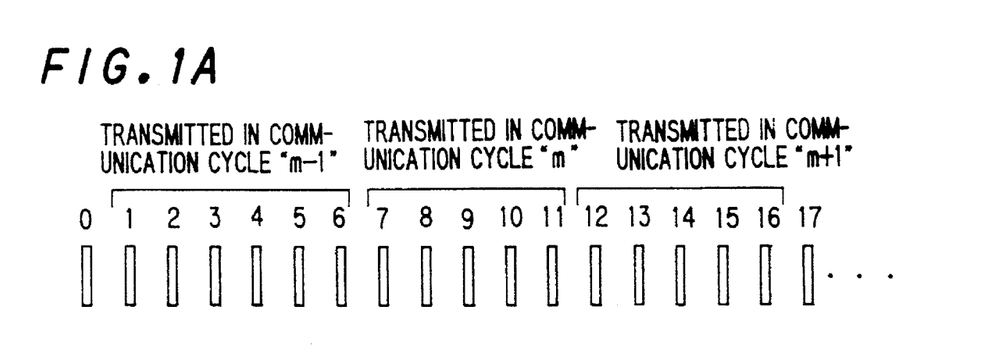
FIGS. 1A–1C schematically represent a transmission example of a data block in a communication system according to an embodiment of the present invention.
Figure 1B:
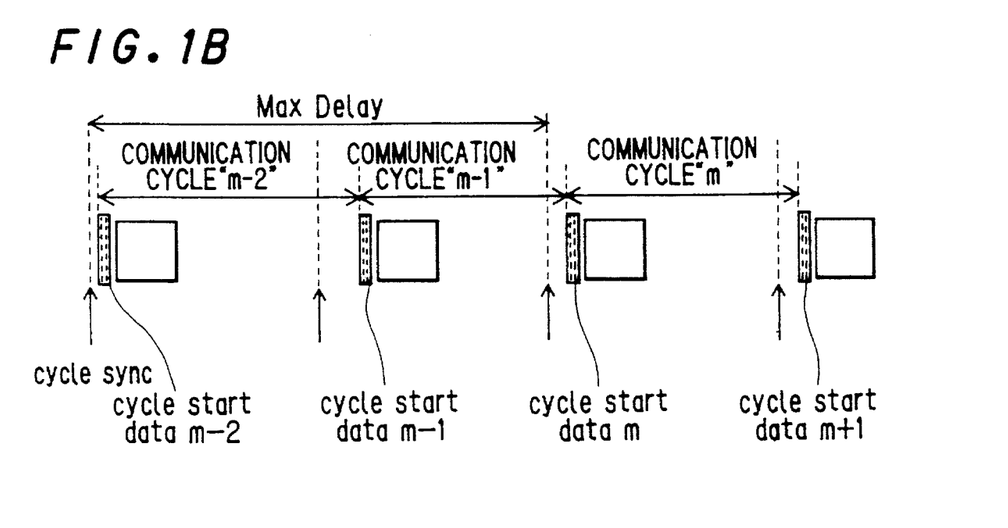
Figure 1C:
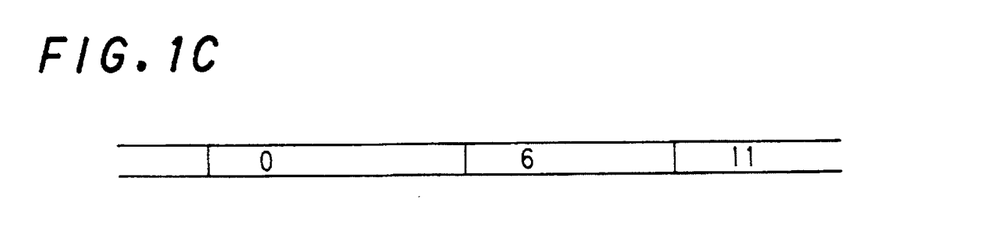

FIG. 1 schematically shows a transmission example of data blocks in the communication system according to the present invention.

It should be noted that FIG. 1(a) indicates a data block received by a transmitter circuit, FIG. 1(b) shows a packet transmitted from the transmitter circuit, and FIG. 1(c) denotes the number of the last data block transmitted.

In the present invention, the concept is introduced in which "maximum data block number" and "Max Delay" are employed so as to represent a relationship between a data block received by the transmitter circuit and a data block within a packet transmitted from the transmitter circuit.

The maximum data block number corresponds to a maximum value of a data block number which can be transmitted by a single packet. This maximum data block number is set to such a value which is greater than the maximum block number of data received by the transmitter circuit within 125 microseconds corresponding to a cycle sync period. In FIG. 1, since the data block received by the transmitter circuit in an interval of approximately 24 microseconds, this maximum number is set to 6 whereas the maximum data block number is set to 7.

The Max Delay corresponds to a maximum value of delay time defined after the data block has been received by the transmitter circuit until this data block is sent out. In case of FIG. 1, the Max Delay is equal to 250 microseconds.

As to a data block transmitted within one communication cycle, such data blocks which have not yet been transmitted are combined into a single packet and this single data packet is transmitted along with data blocks which have been received from a cycle sync just before a time instant when cycle start data is received up to the Max Delay. It should be noted that the number of data blocks does not exceed the maximum data block number. Since the number of a data block which is finally transmitted is stored, it may be recognized which data blocks have been transmitted.

In case of FIG. 1, data blocks up to the data block "0" are transmitted in the communication cycle m−2, the data blocks "1" to "6" are transmitted in the communication cycle m−1, the data blocks 7 to 11 are transmitted in the communication cycle m, and the data blocks 12 to 16 are transmitted in the communication cycle m+1.

Figure 2A:
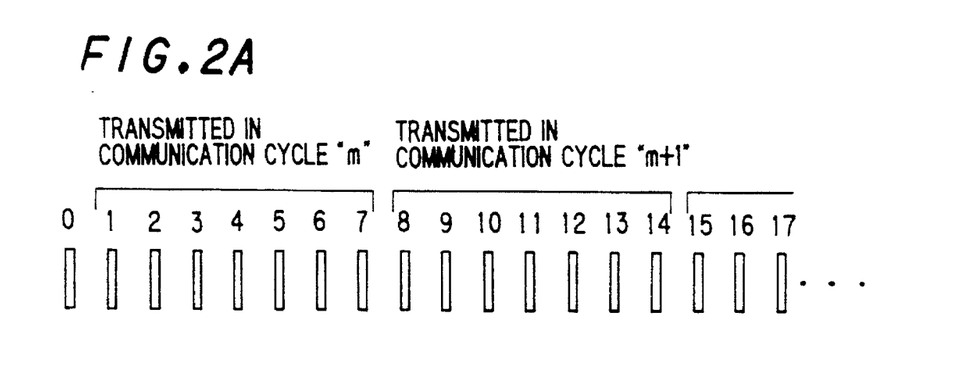
FIGS. 2A–2C schematically show another transmission example of the data block in the communication system of the present invention when cycle start data is dropped out.
Figure 2B:
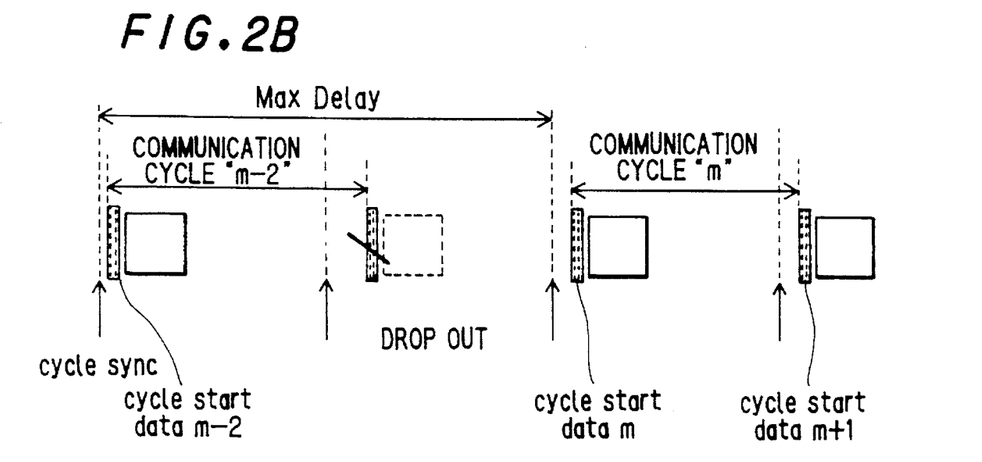
Figure 2C:
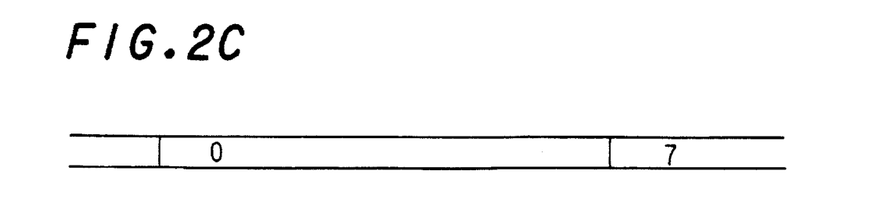

FIG. 2 schematically shows a transmission example when cycle start data is dropped out in accordance with the present invention. It should also be noted in FIG. 2 that an interval of data blocks received by a transmitter circuit, the maximum data block number, and Max Delay are identical to those of FIG. 1. Similarly, data blocks up to a data block "0" are transmitted in the communication cycle m−2 similarly as in FIG. 1. However, since the cycle start data m−1 is dropped out in this drawing, the data blocks 1 to 6 cannot be transmitted in the communication cycle m−1.

Thus, these data blocks 1 to 6 are transmitted in the communication cycle m commenced from the cycle start data m. Then, as seven data blocks can be transmitted as a single data packet at maximum in this embodiment, the data blocks 1 to 6 and the data block 7 are combined with each other to form a single packet which will then be transmitted. Similarly, in the next communication cycle m+1, data blocks 8 to 14 are transmitted. Subsequently, such data blocks which have not yet been transmitted are combined with each other as a single packet and this single data packet is transmitted among the data blocks which have received from the cycle sink immediately before the cycle start data is received up to the Max Delay.

It should be understood that although the Max Delay is set to twice the interval of the cycle sink in the above-described embodiment, the Max Delay may be made longer than the interval of the cycle sink if it is not required to prevent the drop out of the data block when the cycle start data is dropped out. Conversely, when the data blocks are not dropped out even when more than two cycle start data are continuously dropped out, the Max Delay should be selected to be three times longer than the interval of the cycle sync.

Also, it should be noted that although the maximum data block number is set to be such a number (=7) larger than the maximum number (=6) of data blocks by 1 which are received by the transmitter circuit within one cycle sync in the above-described embodiment, the maximum data block number may be set to be larger than 2.

Furthermore, although the maximum value of the data blocks which have been received by the transmitter circuit within 1 cycle sync in the above-described embodiment is selected to be 6, the present invention may be applied to such a system that the maximum value of the data blocks received by the transmitter circuit within 1 cycle sync is larger than, or equal to 1.

What is claimed is:

1. A communication system comprising:
   a plurality of appliances;
   a preselected appliance chosen from the plurality of appliances for managing communication between the plurality of appliances and transmitting a communication start signal to the plurality of appliances; and
   a communication bus for delivering blocks of data communicated between the plurality of appliances, wherein
   a maximum number of data blocks transmittable by an appliance in a given communication cycle is greater than a total number of data blocks that correspond to the given communication cycle,
   the data blocks transmitted in each communication cycle are transmitted as a packet,
   a maximum number of data blocks transmittable within a communication cycle is pre-established,
   each communication cycle is initiated by the communication start signal, and
   each communication cycle takes place within a pre-established time interval.

2. The communication system as claimed in claim 1, wherein
   a normal communication cycle is one in which data blocks are transmitted in a packet following a normal communication start signal, and
   when a communication start signal of a communication cycle is not received by an appliance data blocks corresponding to that communication cycle as well as data blocks received within a predetermined time duration are transmitted in subsequent normal communication cycles in first-in-first-out order such that the maximum number of data blocks is transmitted as a packet in each subsequent normal communication cycle until only data blocks corresponding to a given communication cycle are transmitted in the given communication cycle.

3. The communication system as claimed in claim 2, wherein the predetermined time duration starts after the normal communication start signal, and the predetermined time duration is equal to N times the pre-established time interval, where N is an integer greater than 2.

4. The communication system as claimed in claim 2, wherein when a total number of data blocks received within the predetermined time duration exceeds the maximum number of data blocks transmittable within a communication cycle, data blocks are transmitted in first-in-first-out order such that an earlier-received data block is transmitted before a later-received data block.

5. The communication system as claimed in claim 4, wherein the maximum number of data blocks transmittable within a communication cycle is equal to 6, and the pre-established time interval is approximately equal to 125 microseconds.

6. The communication system as claimed in claim 5, wherein each packet of data blocks corresponds to one of a video signal and an audio signal.

7. A communication method for transmitting a plurality of data blocks comprising the steps of:

receiving a communication start signal;

receiving data from an apparatus;

arranging the received data as an array of data blocks, each data block having a predetermined size;

numbering the data blocks;

forming the numbered data blocks into packets of data blocks according to their data block numbers;

outputting a packet of data blocks after a communication start signal is received.

8. The communication method of claim 7, wherein the numbering of data blocks is performed in a FIFO or first-in-first-out order such that an earlier received data block has a lower data block number than a later received data block.

9. The communication method of claim 7, wherein, when a communication start signal of a communication cycle is not received, the data blocks corresponding to that cycle are transmitted in a packet during a subsequent communication cycle for which a communication start signal is received.

10. The communication method of claim 9, wherein the data blocks are processed according to a FIFO or first-in-first-out order in which an earlier received data block is processed before a later received data block.

\* \* \* \* \*

UNITED STATES PATENT AND TRADEMARK OFFICE
CERTIFICATE OF CORRECTION

PATENT NO. : 5,621,725
DATED : April 15, 1997
INVENTOR(S) : HARUMI KAWAMURA, HISATO SHIMA AND KEIKO TAMAMIZU It is certified that error appears in the above-indentified patent and that said Letters Patent is hereby corrected as shown below:

Col.3, line 45, change "part" to --port--
     line 62, after "and" insert --,--
Col.4, lines 15 &16, change "an other" to --another--
     line 17, change "part" to --port--
     line 27, change "assign" to --assigns--
     line 40, after "node" second occurrence, insert --D--
Col.5, line 13, after "is" insert --,--
Col.6, line 58, change "6E" to --6B--
Col.7, line 36, after "block" insert --is--

In the claims:

Col.8, line 67, after "appliance" insert --,--

Signed and Sealed this

Twenty-eighth Day of October, 1997

Attest:

BRUCE LEHMAN

*Attesting Officer*       *Commissioner of Patents and Trademarks*